United States Patent Office 3,472,702
Patented Oct. 14, 1969

3,472,702
RADIOISOTOPE-POWERED THERMOELECTRIC GENERATORS

Francis William Yeats, Benson, Oxon, and Jeremy Stevenson, Denham, England, assignors to United Kingdom Atomic Energy Authority, London, England Filed Apr. 4, 1966, Ser. No. 539,994
Claims priority, application Great Britain, Apr. 8, 1965, 15,022/65
Int. Cl. H01l *15/00;* H01v *3/00;* G21h *11/10*
U.S. Cl. 136—202 16 Claims

ABSTRACT OF THE DISCLOSURE

A thermoelectric generator having thermal insulation inside the radiation shield. A thermoelectric module is held in thermal contact with a radioisotope heat source and is secured to a removable plug in the radiation shield to facilitate removal of the module. The heat source is arranged to be able to rock slightly so as automatically to take up a position of best contact with the module.

This invention relates to radioisotope-powered thermoelectric generators.

According to the present invention, a radioisotope-powered thermoelectric generator comprises a radioisotope heat source, a thermoelectric module in thermal contact with the heat source, and a shield which surrounds said heat source and absorbs atomic radiation emanating therefrom, the shield including a removable plug to which the thermoelectric module is secured.

The invention thus enables the thermoelectric module to be removed from the generator for replacement or inspection, whilst leaving the greater part of the shield intact with the radioisotope heat source inside. The amount of additional shielding necessary when removing the thermoelectric module is thus comparatively small.

Two radioisotope-powered thermoelectric generators in accordance with the present invention will now be described by way of example with reference to the accompanying drawing, in which.

Figure 1:
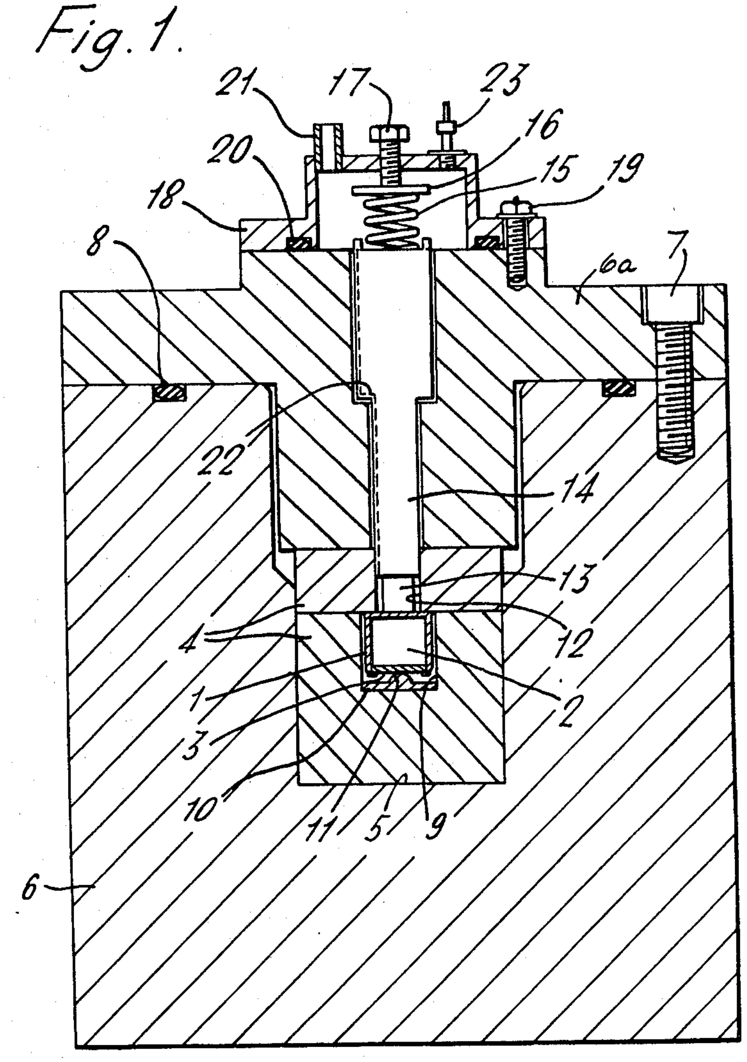
FIGURE 1 shows a cross-section through the first generator.

Referring to FIGURE 1, the first generator is powered by a heat source comprising 700 curies of strontium-90 contained in a sealed stainless steel can 1. The strontium-90 is in the form of a pressed pellet 2 of strontium titanate which fits closely within the can 1, and to improve the thermal conductivity still more the can 1 is filled with helium before a lid 3 is welded on to close it.

Thermal insulation 4 for the heat source 1 is provided by a low thermal conductivity material, which may be a fibrous, microcellular material. This material has a density of about 0.3 gm./cc. and a thermal conductivity in dry helium of some 1.5 x $10^{-4}$ watts/cm./cm.$^2$/° C.

The insulation 4 rests in a recess 5 in the lower part of a shield 6 which absorbs radiation emanating from the strontium-90 and is of sufficient thickness to reduce this radiation to an acceptable level. (Terms such as upper and lower are applied to the generator as shown in FIGURE 1). The upper part of the shield 6 forms a massive lid *6a* held in place by bolts 7 and sealed with an O ring 8. The material of the shield 6 is depleted uranium or a heavy metal alloy.

An axial circular aperture 9 extends into the insulation 4, and in the bottom of the aperture 9 rests on a plate 10 having a central pip 11. The heat source 1, which is a loose fit in the aperture 9, rests on the pip 11. The insulation 4 is conveniently made in two parts, the upper part having an axial circular aperture 12 of smaller diameter than the aperture 9, so that the heat source 1 is retained. The aperture 12 encloses a thermoelectric module 13 which is attached to the lower end of a plug 14 which passes through, and is of the same material as, the lid *6a* of the shield 6. The plug 14 is stepped so as not to provide a "shine" path for radiation.

The thermoelectric module 13 comprises semiconductor thermoelectric elements of known form, the material of the elements being n and p-type bismuth telluride, and the design output of the thermoelectric module 13 being 100 milliwatts when the temperature difference across its length is 140° C. The hot junctions are exposed in the lower surface of the thermoelectric module 13, and to provide good thermal contact with the heat source 1 whilst at the same time providing the necessary electrical insulation, the upper end of the heat source 1 is plasma sprayed with alumina, which is then lapped to give a layer of alumina approximately 0.05 mm. thick with a flat upper surface. The lower end of the thermoelectric module 13 is similarly lapped to provide a mating surface. In order that the cold junctions of the thermoelectric module 13 should be in similarly good thermal contact with the shield 6, which forms a heat sink, the lower end of the plug 14 is similarly plasma sprayed with alumina and lapped to provide a layer approximately 0.05 mm. thick, and the upper surface of the thermoelectric module 13 is lapped to provide a mating surface. The thermoelectric module 13 is then stuck to the plug 14 by a layer of epoxy-resin adhesive approximately 0.01 mm. thick.

The plug 14 is resiliently urged inwards by means of a spring 15 which fits between the outer end of the plug 14 and a plate 16. The spring 15 ensures that the hot junctions of the thermoelectric module 13 are pressed into contact with the heat source 1 which, if necessary, rocks on the pip 11 to bring the mating flat surfaces into contact. The contact pressure is adjusted to approximately 300 gms./cm.$^2$ by means of a bolt 17 which passes through a cover plate 18. The cover plate 18 is held in place by bolts 19 and sealed by an O ring 20.

To reduce the heat losses still further the interior of the shield 6 is evacuated and then filled with dry xenon at a pressure just above atmospheric. The xenon is admitted by way of a tube 21 which is then sealed.

The electrical leads from the thermoelectric module 13 pass up a stepped channel 22 in the plug 14 and out of the cover plate 18 by way of a seal 23. In most applications of the generator the voltage supplied by the thermoelectric module 13 will be insufficient to be used directly. In such cases the voltage is increased by means of a transistor or tunnel diode inverter.

To remove the thermoelectric module 13 for replacement or inspection the cover plate 18 is removed and the plug 14, with the thermoelectric module 13 attached, lifted out. It will be appreciated that the amount of additional shielding necessary to do this is comparatively small, as the heat source 1 remains within the shield 6 and radiation can only pass out by way of the hole left by the plug 14.

In a particular embodiment of the generator the strontium titanate has a total heat output of 4.4 thermal watts and the thermoelectric module 13 supplies the design output of 100 milliwatts. The overall efficiency of the generator is therefore approximately 2½ percent.

Figure 2:
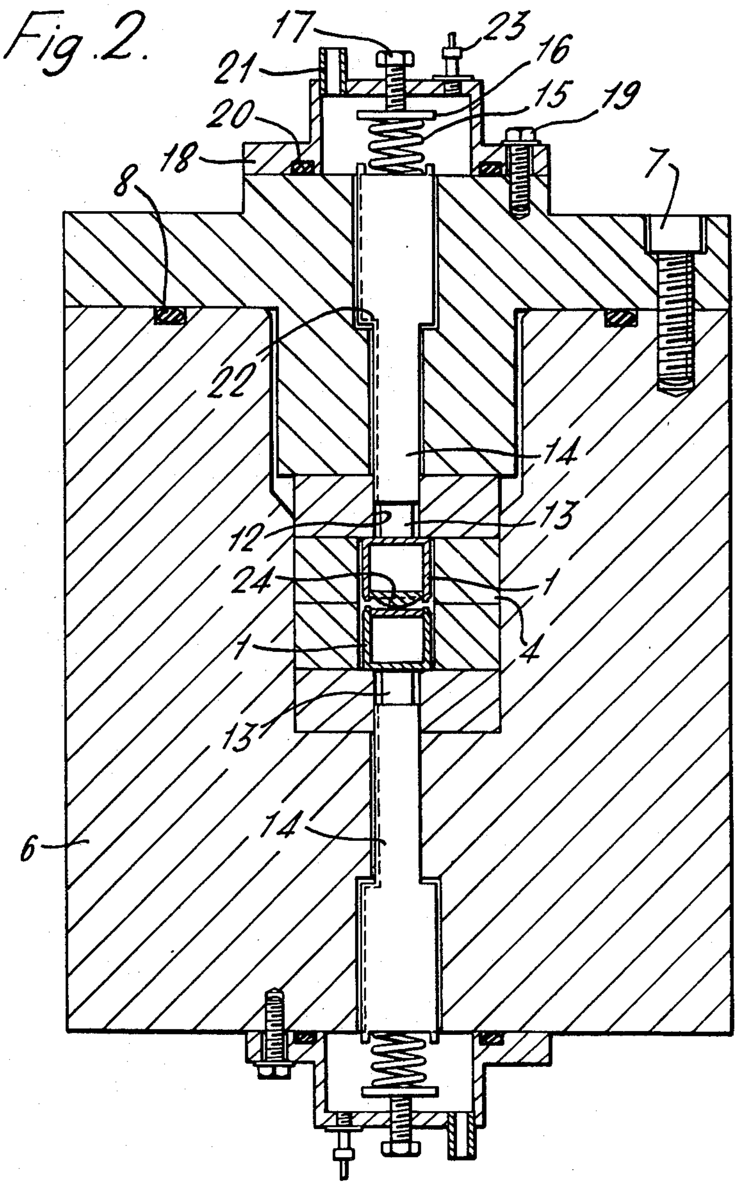
FIGURE 2 shows a diagrammatic cross-section through the second generator.

Referring now to FIGURE 2, this shows a generator of the same general form, but in which there are two heat sources 1, two thermoelectric modules 13 and two plugs 14 which project into the shield 6 from the opposite ends. Apart from these features, and the necessary consequential changes, this generator is similar to the first generator described, with the exception that the plate 10 of the first generator (FIGURE 1) is not provided. To enable the hot junctions of the thermoelectric modules 13 to come into intimate contact with the heat sources 1, the heat sources are enabled to rock relative to one another by providing a domed surface 24 on the base of one of the heat sources 1.

In a particular embodiment of the second generator the strontium titanate has a total heat output of 21 thermal watts and the thermoelectric modules 13 together supply the design output of 750 milliwatts. The overall efficiency of the generator is therefore approximately 3.7 percent.

Such generators may be used for a variety of purposes, particularly in inaccessible locations where a low-maintenance source of electric power is required. They may, for example, be used to power flashing lights mounted on headlands or buoys, or in sonar beacons located on the bottom of the sea or an estuary. They may also be used in underwater telecommunication equipment such as submarine cable repeaters and also in land-based telecommunications equipment such as repeater stations, weather stations and aircraft navigation beacons.

We claim:

1. A radioisotope powered thermoelectric generator comprising a radioisotope heat source, a thermoelectric module in thermal contact with the heat source, a layer of thermally insulating material extending around the heat source, a radiation shield outside the thermally insulating layer and surrounding the heat source to absorb ionising radiation emanating therefrom, the radiation shield including a removable plug to which the thermoelectric module is secured.

2. A generator in accordance with claim 1 wherein the plug is stepped so that atomic radiation cannot "shine" past the plug.

3. A generator in accordance with claim 1 wherein said material is microcellular.

4. A generator is accordance with claim 1 wherein the thermoelectric module comprises semi-conductor thermoelectric elements.

5. A generator in accordance with claim 1 comprising a plurality of thermoelectric modules as aforesaid, and an equal plurality of plugs as aforesaid to which the modules are secured one to one.

6. A generator in accordance with claim 5 comprising two thermoelectric modules and two plugs.

7. A generator in accordance with claim 6 comprising two heat sources as aforesaid, the thermoelectric modules contacting the heat sources one to one.

8. A generator in accordance with claim 1 wherein a thin layer of electrically-insulating material is interposed between the thermoelectric module and the heat source and between the thermoelectric module and the plug, said electrically-insulating material being alumina.

9. A generator in accordance with claim 8 wherein said layer is some 0.05 mm. thick.

10. A generator in accordance with claim 9 wherein the thermoelectric module is secured to the plug by a thin layer of epoxy resin adhesive.

11. A generator in accordance with claim 1 wherein the radioisotope is strontium-90.

12. A generator in accordance with claim 11 wherein the strontium-90 is in the form of strontium titanate.

13. A radioisotope powered thermoelectric generator comprising a radioisotope heat source, a thermoelectric module in thermal contact with the heat source, and a shield which surrounds said heat source and absorbs atomic radiation emanating therefrom, the shield including a removable plug to which the thermoelectric module is secured, a surface of the thermoelectric module contacting a surface of the heat source, and including means for urging said surfaces into contact and enabling said heat source to rock slightly so as to be able to take up the best contact position.

14. A generator as claimed in claim 13 in which the said means for enabling the heat source to rock slightly comprises a domed supporting surface.

15. A generator as claimed in claim 13 wherein the contacting surfaces of the thermoelectric module and the heat source are lapped flat.

16. A generator as claimed in claim 13 and including a layer of thermally insulating material extending around the heat source, and said shield located outside the layer of thermally insulating material.

References Cited

UNITED STATES PATENTS

| | | | |
|---|---|---|---|
| 3,075,030 | 1/1963 | Elm et al. | |
| 3,347,711 | 10/1967 | Banks et al. | 136—202 |
| 3,357,866 | 12/1967 | Belofsky | 136—202 |

ALLAN B. CURTIS, Primary Examiner